United States Patent [19]

Christopher et al.

[11] 4,037,415
[45] July 26, 1977

[54] IMPLOSION ROTARY ENGINE

[76] Inventors: Albert S. Christopher, 2269 Hyland; Robert J. Tufts, P.O. Box 3088, both of Ventura, Calif. 93003

[21] Appl. No.: 702,748

[22] Filed: July 6, 1976

Related U.S. Application Data

[63] Continuation-in-part of Ser. No. 524,078, Nov. 15, 1974, Pat. No. 3,975,914.

[51] Int. Cl.² .................. F01K 25/06; F01K 25/10
[52] U.S. Cl. ................................. 60/673; 60/649; 60/511; 180/66 F
[58] Field of Search ................................. 60/508–515, 60/649, 673; 180/66 F

[56] References Cited

U.S. PATENT DOCUMENTS

| 2,918,907 | 12/1959 | Hausmann | 180/66 F |
| 3,749,145 | 7/1973 | Vegners | 180/66 F |
| 3,945,211 | 3/1976 | Rowe | 60/673 X |
| 3,975,914 | 8/1976 | Tufts et al. | 690/673 |

Primary Examiner—Allen M. Ostrager
Attorney, Agent, or Firm—Ralph B. Pastoriza

[57] ABSTRACT

A rotary engine includes an outer body arranged to rotate on a stationary member, the outer body having an eccentric circular cavity cooperating with radial vanes from the stationary body which sequentially reciprocate so that a series of volumes sequentially increase and decrease in size. Ammonia gas under pressure is introduced on one side of the vanes and when the volumes containing the gas pass their maximum value and start to decrease, water is injected which is immediately absorbed in the ammonia gas to create a vacuum. As a consequence, a push-pull action is provided in each volume to rotate the outer member about the stationary member. A tire may be held on the outer member to provide a vehicle wheel which serves simultaneously as a rolling support and a driving engine for the vehicle.

8 Claims, 16 Drawing Figures

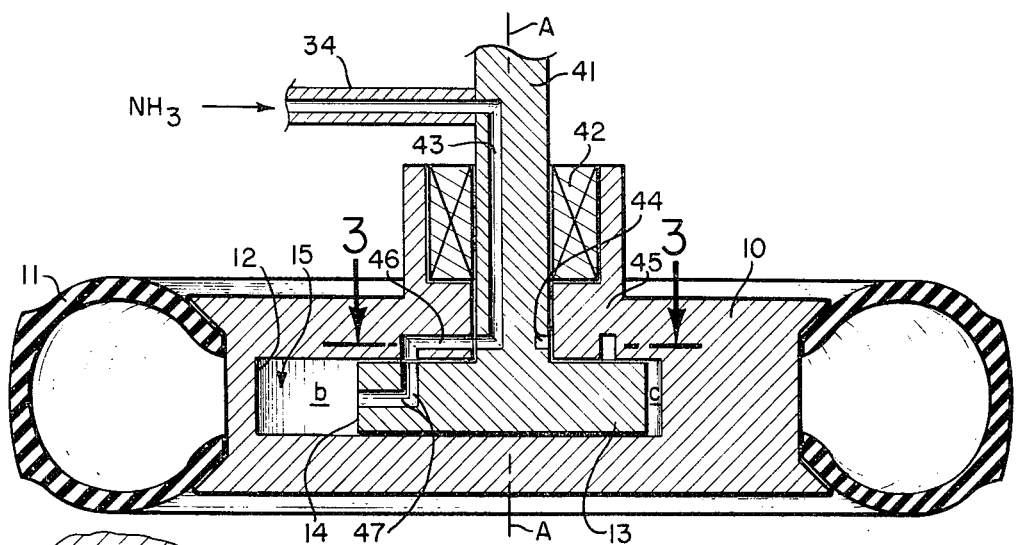
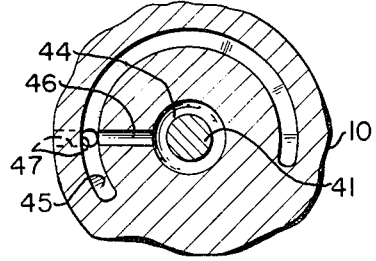
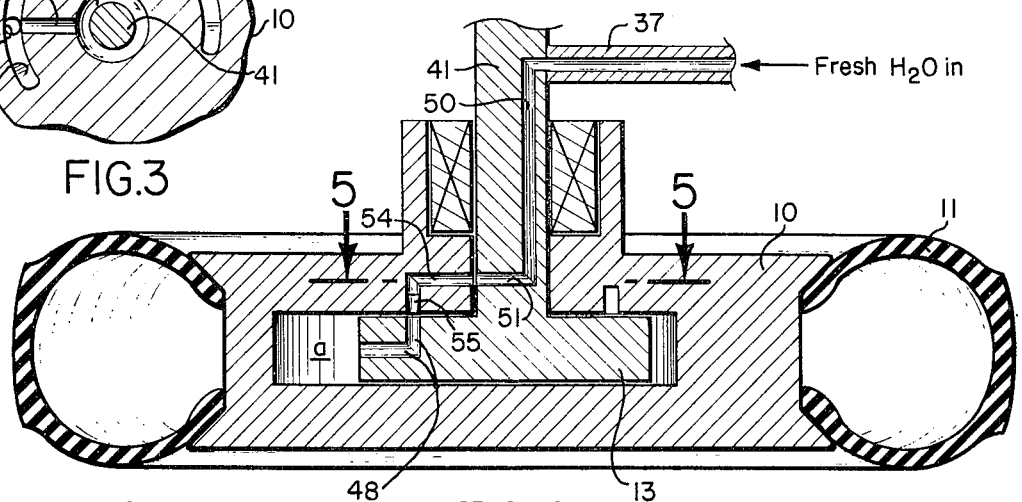
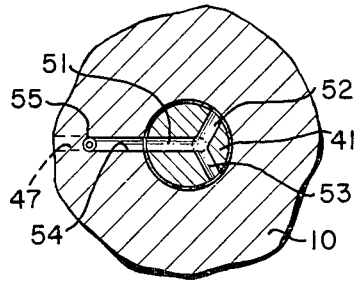
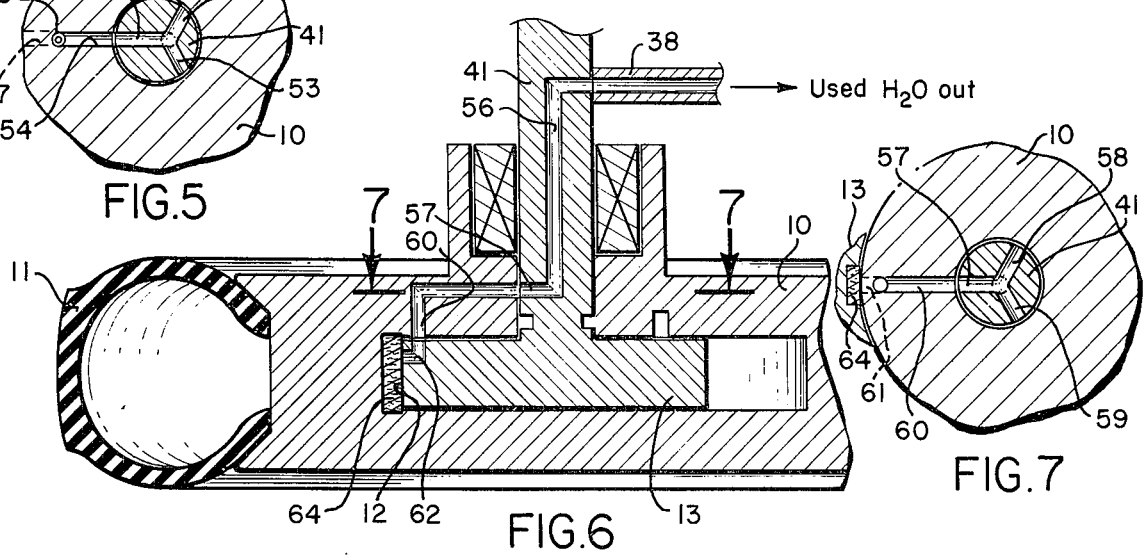

IMPLOSION ROTARY ENGINE

This application is a continuation-in-part of our co-pending U.S. patent application Ser. No. 524,078 filed Nov. 15, 1974, now Pat. No. 3,975,914, and Entitled IMPOSION ENGINE.

This invention relates to a rotary engine of the vane type powered by an implosion resulting from absorption of gas in liquid and uniquely designed in the form of a wheel for substitution with a conventional vehicle wheel to provide a driving engine for the vehicle.

BACKGROUND OF THE INVENTION

Vane type rotary engines are well known in the art. Generally, these engines comprise an outer stator body defining a circular cavity having an inner annular wall. A rotor body in turn is eccentrically mounted in this circular cavity such that the outer wall of the rotor is in tangential engagement at one point with the inner wall of the cavity in the stator. A crescent-shaped volume is thus defined between the outer wall of the rotor and inner wall of the stator and by providing radially extending vanes from the rotor biased outwardly to engage the inner wall of the stator, this crescent shaped volume is divided into two or more volumes, depending upon the number of vanes, which will sequentially increase and decrease in size as the rotor rotates about its own axis.

In our copending patent application identified heretofore, such type of rotary engine is fully disclosed, the same being operated by an implosion effect created by the absorption of ammonia gas in water. In this respect, ammonia gas is introduced into the volumes that are increasing, the pressure of the gas causing the volume increase and after passing through a maximum size, water is injected to immediately absorb the gas and create a vacuum thus contracting or decreasing the volume. A push-pull effect is thus created on each vane to cause rotation of the rotor.

Such a rotary engine operating by implosion resulting from rapid absorption of gas in a liquid has numerous advantages over conventional internal combustion engines, principally the advantage of avoiding any pollution since a closed gas system can be utilized.

While the rotary engine described in our heretofore copending application would serve to power a vehicle, transmission coupling from the engine to the wheels of the vehicle would still be required. It would be highly advantageous if a driving engine for a vehicle could be so designed as to avoid the necessity of drive shafts, differentials, and the like associated with present day vehicles powered by an engine normally located in the forward portion of the vehicle.

BRIEF DESCRIPTION OF THE PRESENT INVENTION

With the foregoing in mind, the present invention contemplates a vane type rotary engine such as described in our heretofore referred to copending patent application but wherein the inner member supporting the vanes is held stationary and the outer member formerly constituting a stator is caused to rotate about the axis of the inner member. With this arrangement, a tire may be mounted on the outer member to serve as a vehicle wheel and thus provide simultaneously rolling support and a driving force for the vehicle.

Further features of this invention include not only the advantages of utilizing an implosion principle to avoid pollutants but additionally a heat exchanger making use of the heat of reaction of the absorption of the gas in the liquid to improve efficiency of the engine.

Still further features include unique valving arrangements wherein the outer rotating member serves to control appropriate inlet means for the gas and liquid; by way of example, ammonia and water. Thus auxiliary valving with crank shafts and the like are wholly avoided.

BRIEF DESCRIPTION OF THE DRAWINGS

A better understanding of this invention will be had by now referring to a preferred embodiment thereof as illustrated in the accompanying drawings in which:

FIG. 2 is an enlarged cross section of the engine itself taken in the direction of the arrows 2—2 of FIG. 8 illustrating the gas inlet means;

FIG. 3 is a fragmentary cross section taken in the direction of the arrows 3—3 of FIG. 2;

FIG. 4 is an enlarged cross section similar to FIG. 2 but taken in the direction of the arrows 4—4 of FIG. 12 showing the liquid inlet means;

FIG. 5 is a fragmentary cross section taken in the direction of the arrows 5—5 of FIG. 4;

FIG. 6 is yet another cross section similar to FIGS. 2 and 4 but taken in the direction of the arrows 6—6 of FIG. 14 illustrating an outlet means;

FIG. 7 is a fragmentary cross section taken in the direction of the arrows 7—7 of FIG. 6.

DETAILED DESCRIPTION OF THE PREFERRED EMBODIMENT

Figure 1:
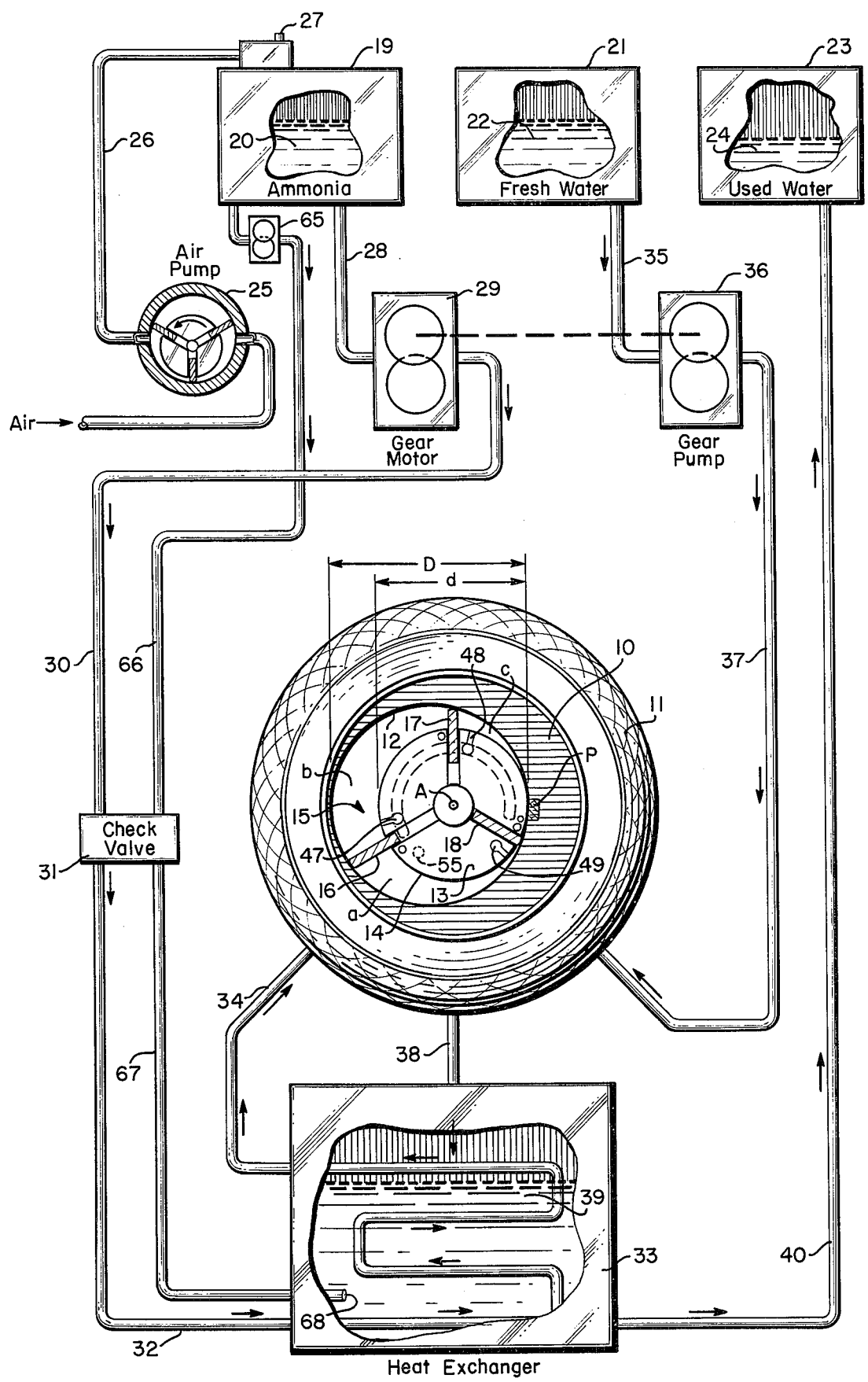
FIG. 1 is an overall schematic view of the engine itself with associated inlet and outlet tubing to various containers or tanks for the gas, liquid and used liquid, portions of the drawing being broken away for purposes of illustration.

Referring to the central portion of FIG. 1, there is shown a first or rotatable member 10 carrying on its periphery a tire 11 to serve as a vehicle wheel. The axis of rotation of the member 10 and tire 11 is indicated at A.

As shown, the first member 10 has an inner annular wall 12 defining a circular cavity of a given diameter D the center of which is off-set from the axis A. Within this circular cavity is a second or stationary member 13 having a circular portion defining an outside annular wall 14 of smaller diameter $d$ than said given diameter D. The center of the stationary member 13 coincides with the axis A and therefore this member is eccentrically positioned with respect to the inner annular wall 12 of the first member 10, the dimensioning being such that the second member 13 is in tangential engagement with the inner wall 12 at one point to thereby define a crescent shaped volume 15 between the inner annular wall 12 and the outer annular wall 14.

The second or stationary member 13 in the particular embodiment illustrated, includes three movable vanes 16, 17 and 18 biased radially outwardly to engage the inner annular wall 12 at circumferentially spaced points, thereby dividing the crescent shaped volume 15 into three volumes $a$, $b$ and $c$. These vanes will reciprocate sequentially as the first or rotatable member 10 rotates about the axis A of the second or stationary member 13 such that the three volumes will sequentially increase and decrease in size.

Referring now to the upper left portion of FIG. 1, there is shown a gas container 19 for holding a gas 20 such as ammonia under a gas pressure of at least 2 atmospheres. When the rotary engine of this invention is used as a wheel to drive a vehicle, the gas container 19 would be carried within the vehicle itself.

Also shown in the upper portion of FIG. 1 is a liquid container 21 holding a given liquid 22 for which the gas 20 has an affinity. When the gas 20 is ammonia, the liquid 22 may be water.

Finally, there is provided a used liquid container 23 for holding water which has absorbed the ammonia indicated at 24.

In order to maintain pressure in the gas tank 19, there may be provided an auxiliary air pump shown at the upper left of FIG. 1 at 25 for passing air through line 26 into the tank 19. A safety valve may be provided as indicated at 27 should excess pressure develop.

A gas inlet means for the engine includes a gas line 28 from the ammonia tank 19 which may be used to drive a gear motor 29, the gas thence passing through a line 30, check valve 31 and line 32 to a heat exchanger 33. From the heat exchanger 33, the gas line passes to the first and second members 10 and 13 by line 34.

A liquid inlet means, in turn, includes a line 35 leading from the liquid tank 21 and including a gear pump 36 for passing liquid through line 37 to the first and second members making up the engine. Gear Motor 29 drives pump 36.

Finally, there is provided an outlet means including an outlet line 38 shown immediately below the members 10 and 13 passing into the heat exchanger 33. This outlet line passes water which has absorbed the ammonia gas into the heat exchanger 33 as indicated at 39, this water being heated as a consequence of the chemical reaction of absorption of the ammonia in the water. The generated heat in turn is transferred to the incoming gas in the line 32 to the line 34 within the heat exchanger 33. After passing through the heat exchanger, the used water 39 passes through a line 40 to the used water tank 23.

Essentially the heat from the heat exchanger aids in vaporizing the pressurized ammonia gas passing to the engine from the line 32 to the inlet line 34.

Referring now to the cross section of FIG. 2, further details of the gas inlet means will be described. As shown in FIG. 2, the second or stationary member 13 includes an integral extension along the axis A—A as at 41, this portion of the second or stationary member supporting a bearing 42 for the first or rotatable member 10 carrying the tire 11. The eccentric relationship between the second member 13 and the inner annular wall 12 of the circular cavity in the first member will be evident from FIG. 2.

The gas inlet line 34 described in FIG. 1 is shown entering the extended portion 41 of the second member 13 to communicate with a gas passage 43 terminating in an annular chamber 44 which extends over 360°. The first or rotatable member 10, in turn, includes an arcuate channel 45 extending a circumferential distance greater than 180° and arranged to be in constant communication with the annular chamber 44 by branch passage 46.

The gas inlet means is completed by the provision of three inlet passages in the second or stationary member 13 communicating through its outer annular wall 14 with the three volumes a, b and c respectively. The particular inlet passage communicating with the volume b is shown at 47 in FIG. 2, the other two passages 48 and 49 being indicated in FIG. 1.

The annular chamber 44 and arcuate channel 45 are more clearly illustrated in the fragmentary cross section of FIG. 3 wherein it will be evident that pressurized gas will always be available in the annular chamber 44 and by way of the passage 46, will always fill the arcuate channel 45. Rotation of the first member 10 and thus rotation of the arcuate channel 45 will result in sequential communication with stationary inlet passages 47, 48 and 49 in the second or stationary member 13. The geometry is such that gas under pressure will be supplied to those ones of the three volumes a, b, and c which are increasing in size.

FIG. 4 illustrates in greater detail the portion of the liquid inlet means receiving water in the line 37. Thus, as in the case of the gas inlet means there is provided a liquid passage 15 in the extended portion 41 of the second or stationary member 13 communicating with the passage 37 and thence branching into three radial passages one of which is shown at 51 in FIG. 4. The other radial passages are indicated at 52 and 53 in the fragmentary cross section of FIG. 5.

As shown in FIG. 4, there is provided a single commutating passage 54 in the first or rotatable member 10 adjacent to one end of the arcuate channel 45 described in FIG. 2. This commutating channel 54 carries a nozzle 55 and upon rotation of the rotatable member 10 about the stationary member 13, the commutating passage 54 and nozzle 55 will be sequentially placed into communication with the gas inlet passages such as passage 48 illustrated in FIG. 4.

The gas inlet pasages 47, 48 and 49 reproduced in phantom in the cross section of FIG. 5 thus also serve to introduce liquid or water in the form of a mist or spray created by the nozzle carried in the commutating passage. The position of the commutating passage and nozzle is such that the sequential communication occurs to introduce the liquid into each volume immediately after it passes its maximum size so that the volume is decreasing or contracting.

Figure 14:
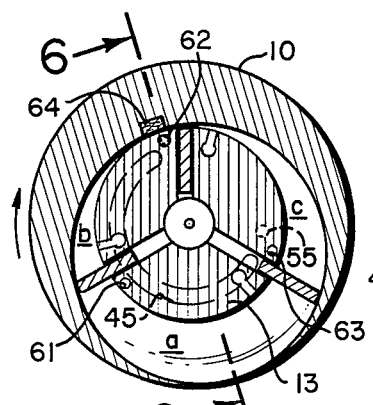

Referring now to FIG. 6, the portion of the outlet means connecting to the outlet line 38 described in FIG. 1 is shown in greater detail. Again there is provided in the extended portion 41 an outlet passage 56 communicating with the line 38, this passage 56 branching into three radial passages, one of which is shown at 57 in FIG. 6, the other two being shown in the fragmentary cross section of FIG. 7 at 58 and 59. Again, there is provided a commutating passage 60 in the rotatable member 10 serving to sequentially connect the branch outlet passages to small outlet ports 62 as shown in FIG. 6 and 61 and 63 as shown in FIG. 14 in the second or stationary member 13. The positioning is such that liquid in the three volumes a, b and c which has absorbed the gas can be removed as the particular volume approaches its minimum size at which point, the commutating passages 60 will place one of the branch passages into communication with the corresponding port. In order to wipe all of the liquid from the chamber as it approaches its minimum size, a wiper member 64 is carried on the inner annular wall 12 of the rotatable member 10 as illustrated in FIG. 6.

OPERATION

With the foregoing description in mind, the entire operation of the implosion rotary engine of this invention will now be understood by reference to the diagramatic views of FIGS. 8 through 16.

Figure 8:
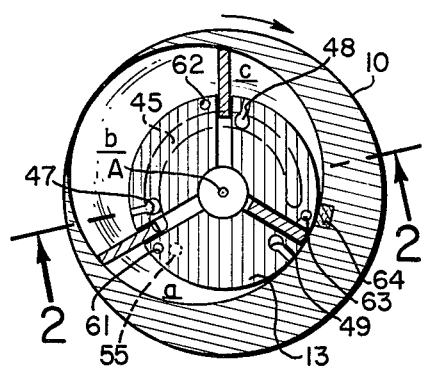
FIGS. 8 through 16 are diagramatic illustrations of successive positions of the rotary engine throughout one complete rotation over 360° useful in explaining the operation.

Referring first to FIG. 8, the rotatable member 10 and stationary member 13 are close to the relative positions as shown and described in FIG. 1. Assume that the direction of rotation for the rotatable member 10 is clockwise as indicated by the arrow. Under these conditions, the volumes b and c are increasing and the volume a is decreasing. It is to be understood in the various FIGS. 8 through 16 that the arcuate channel 45 is in the rotatable member but is reproduced on top of the stationary member 13. Similarly, the liquid inlet nozzle and passage 55 are reproduced on the drawings even through they are carried by the rotatable member 10. The inlet passages 47, 48 and 49 along with the vanes are all stationary as part of the stationary member 13. Similarly, the water outlet ports 61, 62 and 63 are stationary on the member 13 it being understood that the water outlet commutating passage 60 described in FIG. 6 will sequentially register with these ports.

Under the conditions of FIG. 8, it will be evident that gas is being introduced into the expanding volumes b and c through the arcuate channel 45 and inlet passages 47 and 48. Since the gas introduced is under pressure, it will expand the volumes b and c to their maximum extent.

Figure 9:
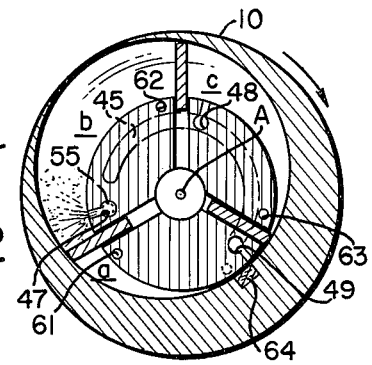

Referring to FIG. 9, the further rotation of the member 10 has resulted in the volume b passing its maximum size and at this point, the nozzle 55 has come into registration with the inlet passage 47 thereby ejecting a spray of liquid into the volume b. The C-shaped channel 45 is still in communication with the inlet passage 48 for the volume c which is still expanding. This channel, however, is no longer in communication with the volume b.

The liquid sprayed into the volume b immediately absorbs the gas thereby creating a vacuum which acts to further decrease the volume b.

Figure 10:
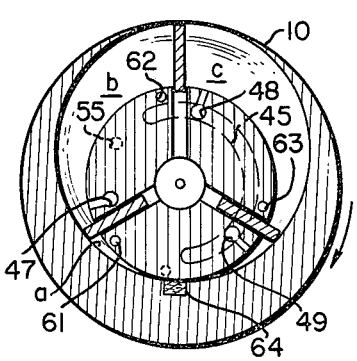

FIG. 10 illustrates a further rotative position of the first member 10 relative to the stationary member 13 wherein the volume c is still expanding and the volume b contracing.

Figure 11:
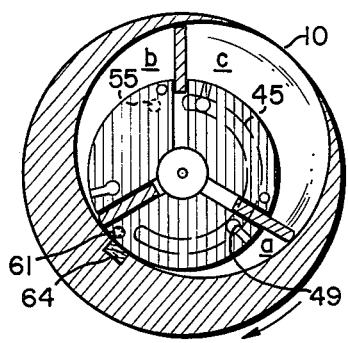

In FIG. 11, the volume a has been minimized, the wiper 64 on the inner annular wall 12 removing the liquid which has absorbed the gas from the outlet port 61 which at this point is in communication with the commutating passage 60 described in FIG. 6. It will also be noted in FIG. 11 that the arcuate channel 45 is in communication with the inlet passage 49 to introduce gas into the now expanding volume a.

Figure 12:
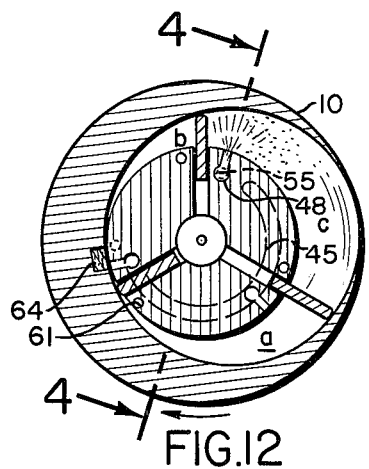

In FIG. 12, the volume c has passed its maximum size and at this point, liquid is introduced into the volume through the nozzle 55 which absorbs the gas therein and further contracts the volume c.

Figure 13:
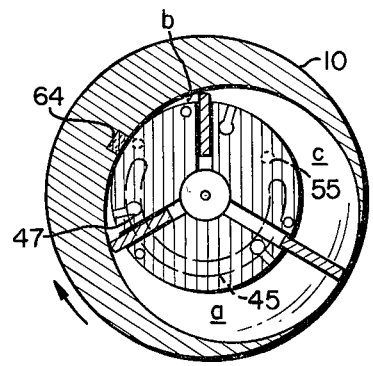

FIG. 13 illustrates the chamber b which is now placed in communication through the inlet passage 47 with the arcuate channel 45 initially expanding, the volume a also expanding and the volume c still contracting or decreasing.

In FIG. 14, the last wiping out of liquid in the volume b is taking place through the outlet port 62 by the wiper 64, the volume a is at its maximum volume, and the volume c is still contracting.

Figure 15:
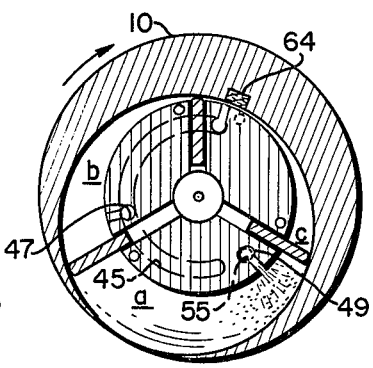

FIG. 15 illustrates the volume a after passing its maximum size wherein again the liquid or water is introduced by the nozzle 55 in the inlet passage 49, the volume b expanding since its inlet passage 47 is in communication with the arcuate channel 45. Introduction of the liquid into the volume a causes absorption of the gas therein which contracts this volume.

Figure 16:
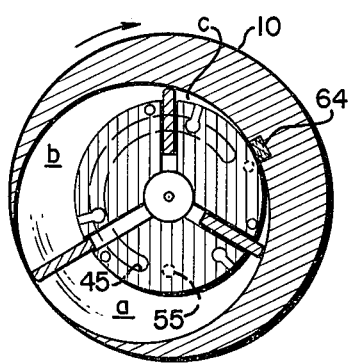

FIG. 16 illustrates the components approaching their original positions as depicted in FIG. 8, the entire cycling as described continuously repeating.

From the foregoing, it will be evident that rotation of the rotatable member is effected by both expanding and contracting or implosion forces.

The wiped out water as described in conjunction with FIG. 1 is passed to the used water container 23.

When the engine as described is used on a vehicle with one or more of the wheels, preferably all four each comprising a rotary engine as described in FIG. 1, the vehicle can run for several hundred miles before it is required to provide fresh ammonia under pressure and fresh water.

Since there is a closed gas system during operation there are absolutely no pollutants. Moreover, the engine will run very quietly.

Speed and torque control can, of course, be effected by controlling the rate of introduction of the gas from the gas container as well as by the pressure of the gas in the gas container. The check valve 31 described in FIG. 1 prevents backing up of the gas from the heat exchanger 33 this heat exchanger assuring that the gas is volatilized and at proper pressure.

In extreme cold weather conditions, proper heating of the gas to be introduced by the heat exchanger 33 can be augmented by increasing the heat of the used water 39 in the heat exchanger. This additional heating can be accomplished by passing directly ammonia through the pump 65 and line 66 check valve 31 and line 67, to the outlet 68 in the heat exchanger. The absorption of the ammonia in the water generates heat as a consequence of the reaction involved. For normal conditions, however, the valve 65 and lines 66 and 67 would not be used.

From all of the foregoing, it will thus be evident that the present invention has provided a greatly improved implosion type rotary engine particularly suitable for vehicles wherein the design of the engine is such as not only to serve as a wheel for rolling support of the vehicle, but also as the driving force therefor.

What is claimed is:

1. An implosion rotary engine including, in combination:
   a. a first member having an inner annular wall of given diameter defining a circular cavity;
   b. a second member having an outer annular wall of outside diameter smaller than said given diameter eccentrically positioned in said cavity with respect to the center of said cavity so as to be in tangential engagement with said inner wall at one point whereby a crescent shaped volume is defined between said inner annular wall and outer annular wall;
   c. at least one movable vane in said second member radially extending from its outer annular wall to engage said inner annular wall and divide said crescent shaped volume into first and second volumes on opposite sides of said vane, said members being mounted for relative rotation about an axis passing through the center of said second member so that said vane reciprocates in and out as it passes said one point of tangency and said volumes sequentially increase and decrease in size;

d. a gas container holding a given gas under at least 2 atmospheres of pressure;

e. a liquid container holding a given liquid for which said gas has a chemical affinity;

f. a used liquid container;

g. gas inlet means connected between said gas container and the members for sequentially introducing said given gas into said first and second volumes only when they are increasing in size;

h. liquid inlet means connected between said liquid container and said members for sequentially introducing liquid into said first and second volumes only when they are decreasing in size;

i. outlet means connected between said used liquid container and said members for sequentially passing liquid which has absorbed said given gas from said volumes as said volumes reach minimum sizes; and j. a heat exchanger housing for effecting heat exchange between used liquid passing from said outlet means to said used liquid container and incoming gas from said gas container, heat being generated by absorption of said gas in said liquid whereby gas introduced to the members expands the volume receiving the gas and water introduced into said volume when the members reach a relative rotative position such that the volume starts decreasing absorbs said gas to create a vacuum contracting said volume so that relative rotation of said members is sustained.

2. An engine according to claim 1, in which said second member is stationarily mounted and said first member is bearingly mounted to said second member to rotate about the center axis of said second member whereby said first member can function as a wheel.

3. An engine according to claim 1, in which there are provided three vanes in said second member circumferentially spaced at 120° to divide said crescent shaped volume into three volumes which sequentially increase and decrease in size as a result of relative rotation between said members.

4. An engine according to claim 1, in which said inlet means includes a check valve blocking reverse passage of said gas from said members back into said gas container.

5. An engine according to claim 1, in which said liquid inlet means including a pump providing liquid under pressure to said members; and a nozzle means in said liquid inlet means for introducing said liquid in the form of a spray mist.

6. An engine according to claim 5, including a motor means in the line connecting said gas container to said members coupled to drive said pump.

7. An engine according to claim 1, including an auxiliary line from said gas container to used liquid in said heat exchanger to generate heat by direct absorption of gas in said auxiliary passage to thereby provide additional heating to the pressurized gas passing to said members.

8. An engine according to claim 1, in which said given gas is ammonia and said liquid is water.

* * * * *